J. G. RISING.
TOILET DISINFECTANT.
APPLICATION FILED FEB. 23, 1912. RENEWED JUNE 30, 1913.
1,083,561. Patented Jan. 6, 1914.
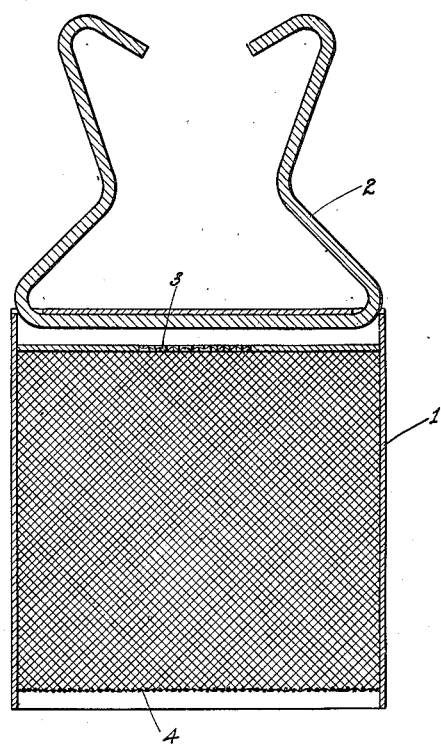
Witnesses
Clarence Smith
J. B. Webster
Inventor
John G Rising
Percy S. Webster
Attorney

UNITED STATES PATENT OFFICE.

JOHN G. RISING, OF STOCKTON, CALIFORNIA, ASSIGNOR OF ONE-FOURTH TO ARTHUR R. KIRKLAND, OF STOCKTON, CALIFORNIA, AND ONE-FOURTH TO JOHN L. MARTIN, OF LOS ANGELES, CALIFORNIA.

TOILET DISINFECTANT.

1,083,561.  Specification of Letters Patent.  Patented Jan. 6, 1914.

Application filed February 23, 1912, Serial No. 679,439. Renewed June 30, 1913. Serial No. 776,738.

*To all whom it may concern:*

Be it known that I, JOHN G. RISING, a citizen of the United States, residing at Stockton, in the county of San Joaquin, State of California, have invented certain new and useful Improvements in Toilet Disinfectant; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in disinfectants and particularly to a toilet disinfectant, the object of the invention being to produce a toilet disinfectant made out of chemicals formed in one solid cake formed and baked into a retaining receptacle which may be hung or otherwise suspended in the toilet, the ingredients of the cake within such receptacle being such as will not only thoroughly disinfect the toilet but will prevent the accumulation of any deposits or any discoloring matter on the sides of the toilet. These objects I accomplish by means of such composition and relative proportions of ingredients as will fully appear by a perusal of the following specification and claim.

The accompanying drawings show a section of the cake and receptacle.

Referring now more particularly to the composition and method of making my new disinfectant I first take the following ingredients in the following proportions to-wit: I form the disinfectant in cakes in the receptacle and each is approximately two and one-half inches long and one inch wide, and each cake is composed of: One ounce plaster Paris, one-half ounce of carbolic acid, one-quarter of an ounce of pulverized cyanid of potassium, one-quarter of an ounce of a forty per cent. solution of formaldehyde, one-quarter ounce of gum camphor, one-half ounce of flake naphthalene, one ounce of crude petroleum, one and one-quarter ounces of cotton, one-quarter ounce of any perfume desired such as one made from amyl acetate, and one ounce of suitable coloring matter such as Paris green or any other coloring matter found desirable. These elements are mixed together in the form of paste and then formed into the shape of the cake and placed in the receptacle 1 and baked from eight to ten hours until such cake gets thoroughly hardened and dry. The plaster Paris forms the necessary body for the cake, while the chemical elements form the disinfectant, and the cotton acts as a binder to hold the cake into one solid mass and to prevent it from disintegrating too rapidly when in use.

The cake when made or in the process of making is formed in the receptacle 1 provided with a wire hanger 2 by means of which it may be suspended in the toilet in such a manner as to permit of the flushing water of the toilet to wash over it whenever the toilet is flushed, thus wearing away a portion of it for the purpose of disinfecting and cleansing the toilet. The receptacle 1 has a top screen 3 and a bottom screen 4 which permits of this wearing away process and at the same time prevents too rapid a disintegration.

While I have described the cake as made of certain fixed proportions any slight deviation from the same would not materially affect the result.

As will be readily seen the combination of disinfecting elements set forth above will not only act as a disinfectant for the toilet but the water running over the disinfectant every time will cause the elements to not only disinfect the toilet but keep the same free from deposits and discoloration.

From the foregoing description it will be readily seen that I have produced such a disinfectant as will substantially fulfil the object of the invention as set forth herein.

Having thus described my invention what I claim as new and useful and desire to secure by Letters Patent is:—

A disinfectant cake composed of a body element, a binding element, pulverized cyanid of potassium, a solution of formaldehyde, carbolic acid, ammonia, gum camphor, flake naphthalene and crude petroleum, as described.

In testimony whereof I affix my signature in presence of two witnesses.

JOHN G. RISING.

Witnesses:
CLARENCE SMITH,
STEPHEN N. BLEWETT.